(No Model.)

G. REID.
GRAPPLING SHACKLE.

No. 465,069. Patented Dec. 15, 1891.

Witnesses
J. Ulke Jr.
H. F. Riley

Inventor
George Reid.
By his Attorneys,
C. A. Snow & Co.

UNITED STATES PATENT OFFICE.

GEORGE REID, OF REESE, MICHIGAN.

GRAPPLING-SHACKLE.

SPECIFICATION forming part of Letters Patent No. 465,069, dated December 15, 1891.

Application filed April 24, 1891. Serial No. 390,307. (No model.)

*To all whom it may concern:*

Be it known that I, GEORGE REID, a subject of the Queen of Great Britain, residing at Reese, in the county of Tuscola and State of Michigan, have invented a new and useful Grappling-Shackle, of which the following is a specification.

The invention relates to improvements in grappling-shackles.

The object of the present invention is to provide a simple and inexpensive and easily-operated grappling-shackle adapted to serve as a handcuff, also for catching animals, and for kindred purposes.

The invention consists in the construction and novel combination and arrangement of parts hereinafter fully described, illustrated in the accompanying drawings, and pointed out in the claims hereto appended.

Figure 2:
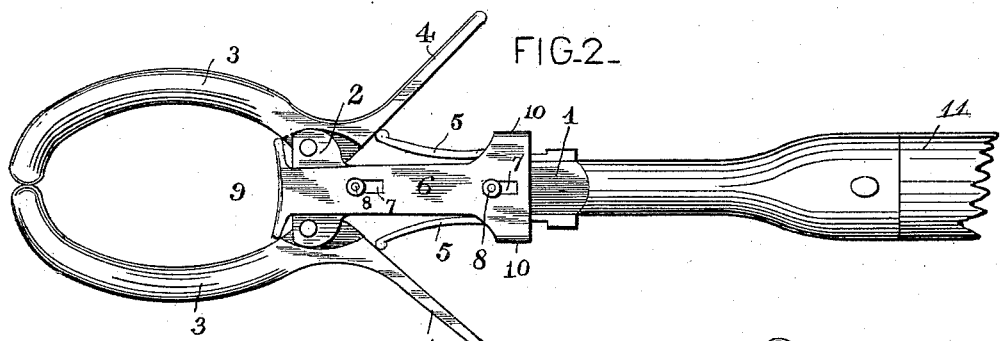
Figure 1:
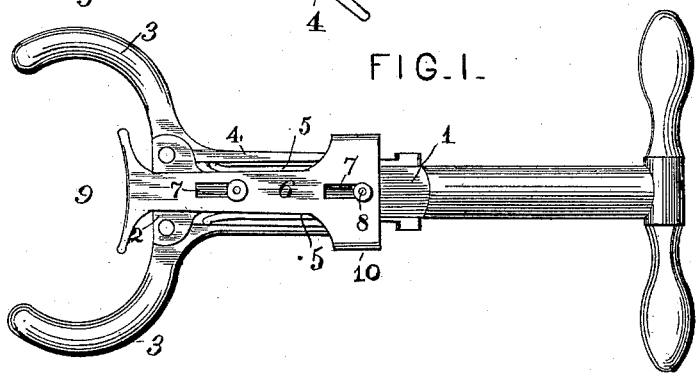
Figure 3:
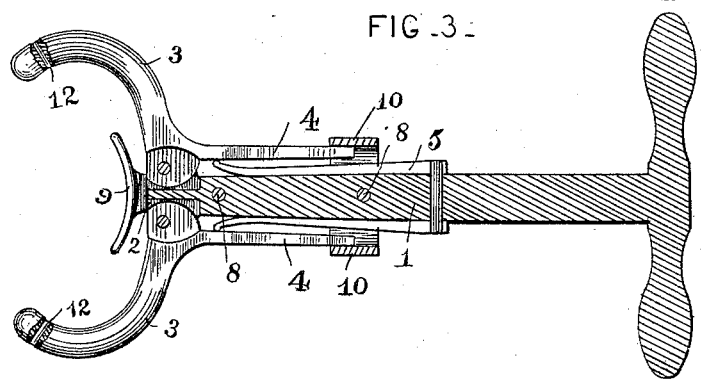
Figure 4:
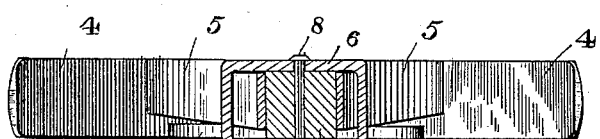

In the drawings, Figure 1 is a side elevation of a grappling-shackle constructed in accordance with this invention and adapted to serve as a handcuff. Fig. 2 is a similar view, the device being constructed to form an animal-catcher. Fig. 3 is a longitudinal sectional view. Fig. 4 is a transverse sectional view.

Referring to the accompanying drawings, 1 designates a shank provided at one end with perforated ears 2, arranged at each side of the shank and having pivoted between them curved jaws 3, which are spring-actuated, and are adapted to close to secure between them the leg of an animal or the wrist of a person, or the like. The curved jaws are provided with integral rearward extensions 4, which are engaged by the outer ends of springs 5, and the latter have their inner ends secured to opposite sides of the shank, and they are adapted to hold the jaws closed and to close them with considerable force sufficient to secure an animal. The jaws are held open or set by a sliding plate 6, which is provided near its ends with longitudinal slots 7, and is secured to the shank by screws 8, arranged in the slots, and is provided at its outer end with a curved flange 9 and at its inner end with angularly-disposed lugs 10, arranged at opposite sides of the shank. The angularly-disposed lugs are adapted to engage the ends of the rearward extension 4 and hold the jaws open or set, and the jaws are released or sprung by the curved flange, which is adapted to engage the animal to be caught. When the curved flange comes in contact with an animal or part of the same, the plate 6 is moved inward and the lugs 10 are carried out of engagement with the extensions 4 and the jaws are released. The slots 7 limit the movement of the sliding plate 6.

The shank, when the device is designed to be employed as a handcuff, is provided with a handle or bar arranged at an angle to the shank and disposed at the inner end thereof, as illustrated in Fig. 1 of the accompanying drawings, and when the device is to be used as an animal-catcher, the shank is provided with a socket to receive a pole 11, as illustrated in Fig. 2 of the accompanying drawings. The leg of a hog or the nose of a bull or the like may be readily seized by the grappling-shackle. The outer ends of the curved jaws are provided with perforations 12, in which may be placed small pins to adapt the device to be employed for catching fish and to dispense with the use of a spear for this purpose.

From the foregoing description and the accompanying drawings the construction, operation and the advantages of the invention will readily be seen, and the variety of purposes to which the device is applicable will be readily understood.

What I claim is—

1. In a grappling-shackle, the combination of the shank, the spring-actuated jaws pivoted to the shank and provided with rearward extensions, and the plate sliding on the shank and provided at its inner end with lugs adapted to engage the rearward extensions and at its outer end with a flange arranged between the jaws, substantially as described.

2. In a grappling-shackle, the combination of the shank having a handle, the spring-actuated jaws pivoted to the shank and provided with rearward extensions, the sliding plate provided with longitudinal slots and having the curved flange at its outer end, and the angularly-disposed lugs arranged on opposite sides of the shank at the inner end thereof and adapted to engage the rearward extensions, substantially as described.

In testimony that I claim the foregoing as my own I have hereto affixed my signature in presence of two witnesses.

GEORGE REID.

Witnesses:
HENRY MATHERS,
GEORGE W. ROGERS.